United States Patent
Edwards et al.

(10) Patent No.: US 12,517,006 B2
(45) Date of Patent: Jan. 6, 2026

(54) QUALITY CONTROL FOR SEALED LENS PACKAGES

(71) Applicant: Johnson & Johnson Vision Care, Inc., Jacksonville, FL (US)

(72) Inventors: Russell J. Edwards, Jacksonville, FL (US); Edward R Kernick, St. Johns, FL (US); Matthew Opie, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 290 days.

(21) Appl. No.: 17/878,695

(22) Filed: Aug. 1, 2022

(65) Prior Publication Data

US 2023/0065811 A1 Mar. 2, 2023

Related U.S. Application Data

(60) Provisional application No. 63/231,524, filed on Aug. 10, 2021.

(51) Int. Cl.
*G01M 11/02* (2006.01)
*B65B 57/00* (2006.01)
(Continued)

(52) U.S. Cl.
CPC ......... *G01M 11/0278* (2013.01); *B65B 57/00* (2013.01); *B65B 57/02* (2013.01);
(Continued)

(58) Field of Classification Search
CPC .............. G01N 21/90; G01N 21/9036; G01N 21/9081; G01N 21/8806; G01N 21/958;
(Continued)

(56) References Cited

U.S. PATENT DOCUMENTS

| | | | | |
|---|---|---|---|---|
| 5,812,254 A | * | 9/1998 | Ebel | G01M 11/0207 356/124 |
| 2002/0009217 A1 | * | 1/2002 | Bickert | G01M 11/0214 382/141 |
| 2005/0226488 A1 | | 10/2005 | Barry et al. | |
| 2012/0327396 A1 | * | 12/2012 | Sites | G01N 21/8806 356/124 |

(Continued)

FOREIGN PATENT DOCUMENTS

| | | | | |
|---|---|---|---|---|
| EP | 2592328 | | 5/2013 | |
| EP | 2592328 A1 | * | 5/2013 | ......... G01N 21/8806 |
| TW | 202043749 A | * | 12/2020 | |

OTHER PUBLICATIONS

J Lim et al Automated pneumatic vacuum suction robotic arm with computer vision 2020 IOP Conf. Ser.: Mater. Sci. Eng. 801 012134 (Year: 2020).*

(Continued)

*Primary Examiner* — Kara E. Geisel
*Assistant Examiner* — Jonathon Cook
(74) *Attorney, Agent, or Firm* — Kristina Okafor

(57) ABSTRACT

A method for quality control of sealed contact lens packages may comprise disposing a package of a sealed contact lens in a light box, causing the package to be illuminated in the light box by a light source, capturing image data of the illuminated package in the light box, analyzing, based on one or more quality control models, the image data of the illuminated package in the light box, and causing, based on the analyzing, output of a quality control metric indicative of at least an accept or reject condition of the package.

33 Claims, 16 Drawing Sheets

(51) Int. Cl.
  *B65B 57/02* (2006.01)
  *G01N 21/88* (2006.01)
  *G01N 21/90* (2006.01)
  *G01V 8/10* (2006.01)

(52) U.S. Cl.
  CPC ..... *G01M 11/0214* (2013.01); *G01N 21/8806* (2013.01); *G01N 21/90* (2013.01); *G01V 8/10* (2013.01)

(58) Field of Classification Search
  CPC ... G01N 2021/9583; G01N 2021/8816; G01N 2021/8819; G01N 2021/8845; B65B 25/008; B65B 57/02; B65B 57/10; G01M 11/0278; G01M 11/0214
  See application file for complete search history.

(56) References Cited

U.S. PATENT DOCUMENTS

| | | | |
|---|---|---|---|
| 2016/0146698 A1* | 5/2016 | Fechner | G01M 11/0214 356/124 |
| 2018/0195974 A1* | 7/2018 | Kress | H04N 7/181 |
| 2019/0236772 A1* | 8/2019 | Cho | G06T 7/0004 |
| 2020/0130955 A1* | 4/2020 | Brinckmann | B65G 47/91 |
| 2021/0150696 A1* | 5/2021 | Bidault | G06N 3/04 |
| 2021/0299879 A1* | 9/2021 | Pinter | B25J 9/1697 |

OTHER PUBLICATIONS

Machine translation of TW-202043749-A (Year: 2020).*
Extended Search Report for EP22187714 dated Apr. 14, 2023.
EP 22 18 7714 Partial Search Report Date of Mailing Dec. 16, 2022.

* cited by examiner

QUALITY CONTROL FOR SEALED LENS PACKAGES

CROSS REFERENCE TO RELATED APPLICATIONS

This patent application claims the benefit of U.S. Provisional Application No. 63/231,524 filed Aug. 10, 2021, and U.S. Provisional Application No. 63/227,683 filed Jul. 30, 2021.

BACKGROUND

Quality control for packaged contact lenses may rely on inspection and detection prior to the product being sealed in the primary package. However, this allows for the possibility that foreign matter may be introduced after the inspection or that a lens may be lost in a process after the inspection. Additional lenses may be inadvertently dropped into packages prior to sealing.

Improvements are needed.

SUMMARY

The present disclosure relates to a system for quality control of sealed contact lens packages. The system may comprise an end effector configured to engage a package of a sealed contact lens and releasably secure the package to the end effector. The system may comprise a control mechanism comprising an armature coupled to the end effector and configured to control movement of the end effector. The system may comprise a light box comprising a housing having an internal curved reflective surface defining at least a portion of a light cavity, the housing defining an aperture disposed opposite the internal curved reflective surface and allowing access to the light cavity. The system may comprise a light source disposed to emit light into the light cavity and one or more sensors disposed to capture spectral data of the light cavity. A control mechanism may be further configured to cause the end effector to dispose the package in the light cavity, wherein the one or more sensors are configured to capture one or more images of the package in the light cavity illuminated by the light source.

The system may further comprise a computing device in data communication with the one or more sensors. The computing device may comprise a computer readable medium storing instructions, that, when executed, cause the computing device to analyze the one or more images. The image analysis may be based on one or more quality control models and may utilized the one or more images of the package in the light cavity. The result of the analysis may be a quality control metric indicative of at least an accept or reject condition of the package.

The present disclosure relates to methods for quality control of sealed contact lens packages. The method may comprise disposing a package of a sealed contact lens in a light box and causing the package to be illuminated in the light box by a light source. The method further comprises capturing image data of the illuminated package in the light box and analyzing, based on one or more quality control models, the image data of the illuminated package in the light box. The method further comprises causing, based on the analysis, output of a quality control metric indicative of at least an accept or reject condition of the package.

The present disclosure relates to a method for quality control of sealed contact lens packages. The method comprises capturing image data of a package of a sealed contact lens; analyzing, based on one or more quality control models, the image data; and causing, based on the analyzing, output of a quality control metric indicative of at least an accept or reject condition of the package.

The method for quality control of sealed contact lens packages may further comprise a machine learning algorithm and/or rule-based algorithm trained on image data of sealed contact lens packages.

The method for quality control of sealed contact lens packages may further comprise a foreign material detection model, a missing lens detection model, or a multiple lens detection model.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
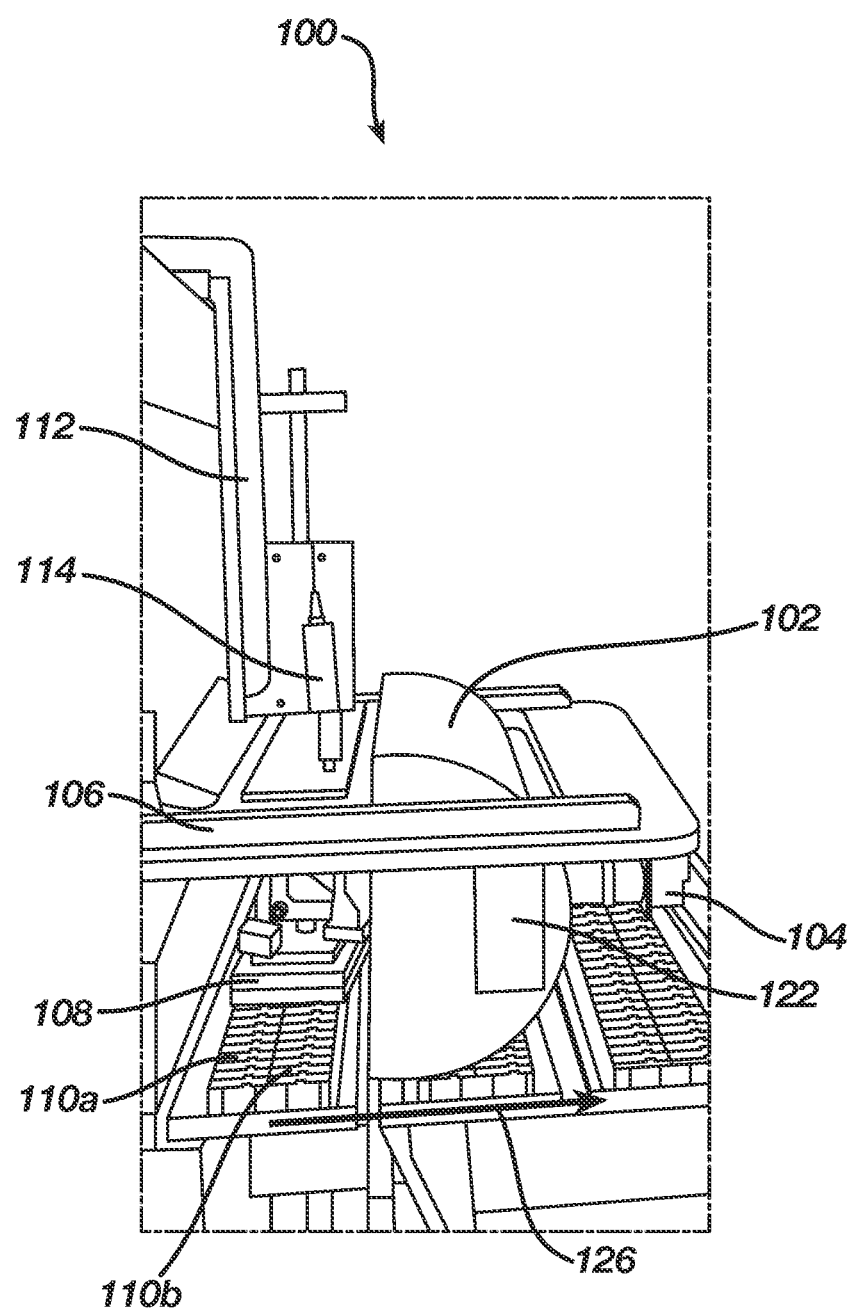
FIG. 1 illustrates an example system in accordance with the present disclosure.

The present disclosure relates to quality control of sealed lens packages. The present disclosure relates to identifying one or more sealed lens packages which may include foreign matter, debris, or an extra (e.g., multiple), or may exhibit a missing lens. Quality control for a package of sealed contact lenses, in accordance with the present disclosure, may comprise determining a quality control metric for the package of sealed contact lenses. The quality control metric may be or comprise accept or reject. The quality control metric may be based at least on the detection of foreign matter, debris, or incorrectly packaged lenses, missing lenses, or multiple lenses in a single package. Other parameters may be used in determine the quality control metric.

The present disclosure relates to inspection for these anomalies (e.g., foreign matter, debris, or incorrectly packaged lenses, missing lenses, or multiple lenses in a single package) after the heat seal process is completed. As an example, inspect of sealed packages may be implemented by capturing images of the completely sealed package from outside of the package body (e.g., bowl). The captured images may then be analyzed such as being processed using a machine learning algorithm and/or rule-based algorithm (e.g., for segmentation). Other analysis of the captured images may be used. If foreign matter, a missing lens condition, or a multiple lens condition is detected, for example, the package is assigned (e.g., with a quality metric) to be rejected (e.g., at a downstream robot station). Other quality control parameters may be detected.

As in illustrative example, Table 1 shows a user survey over five years relating to mis-packaged products or products whose packaging included foreign material, debris, and the like. As show, aluminum, stainless steel, steel and polystyrene together make up 87.9% of identified foreign matter incidences.

TABLE 1

User Survey of Foreign Matter (FM) in Package of Contact Lenses

| Material | Count | Percent | Cumulative % |
| --- | --- | --- | --- |
| Aluminum | 338 | 36.5 | 36.5 |
| Stainless Steel | 225 | 24.3 | 60.8 |
| Polystyrene | 135 | 14.6 | 75.4 |
| Iron | 116 | 12.5 | 87.9 |
| Copper | 40 | 4.3 | 92.2 |
| Fiber | 22 | 2.4 | 94.6 |
| Hair | 14 | 1.5 | 96.1 |
| Other | 36 | 3.9 | 100 |

As a further illustrative example, experimental data shows that the systems and methods of the present disclosure have provided desirable results in detecting foreign matter such as, but not limited to, aluminum lid stock fragments, stainless steel fragments, or plastic fragments that may inadvertently fall into a package when it is open prior to sealing. Additionally or alternatively, other quality control issues may be addressed.

System Overview

A Missing, Multiple, and Debris (MMD) (or foreign matter) detection system for a contact lens packaging line refers to a system used for detecting missing lenses, multiple lenses and debris (a.k.a. foreign matter or particulate) in the primary package after the heat seal process has been completed.

Contact lenses are often packaged for sale in small sealed packets with a solution. These lenses are identified by their magnification or diopters from −9.00 D (or just −9.00) to +6.00 D (or other powers). The present disclosure relates to a system comprising an inspection station for identifying one or more packages with foreign matter inside, missing lens, or multiple lenses. Once identified, instruction may be provided to the processing line to shunt aside those package for manual inspection.

Systems may comprise a gripping stage such as an end effector configured to engage a package of a sealed contact lens and releasably secure the package to the end effector. A control mechanism comprising an armature may be coupled to the end effector and configured to control a movement of the end effector. A light box may comprise a housing having an internal curved reflective surface defining at least a portion of a light cavity, the housing defining an aperture disposed opposite the internal curved reflective surface and allowing access to the light cavity. A light source may be disposed to emit light into the light cavity. One or more sensors may be disposed to capture spectral data of the light cavity. In use, the control mechanism may be configured to cause the end effector to dispose the package in the light cavity, and wherein the one or more sensors are configured to capture one or more images of the package in the light cavity illuminated by the light source.

FIGS. 1-5 shows a system 100 used to identify sealed lens packages with quality control issues such as those containing a missing lens, multiple lenses, an incorrectly packaged lens, or debris. The system may comprise a light box 102. The light box may comprise housing having an internal curved reflective surface defining at least a portion of a light cavity, the housing defining an aperture disposed opposite the internal curved reflective surface and allowing access to the light cavity. The light box 102 may be attached to a platform 106 by a mounting plate 122.

Figure 6:
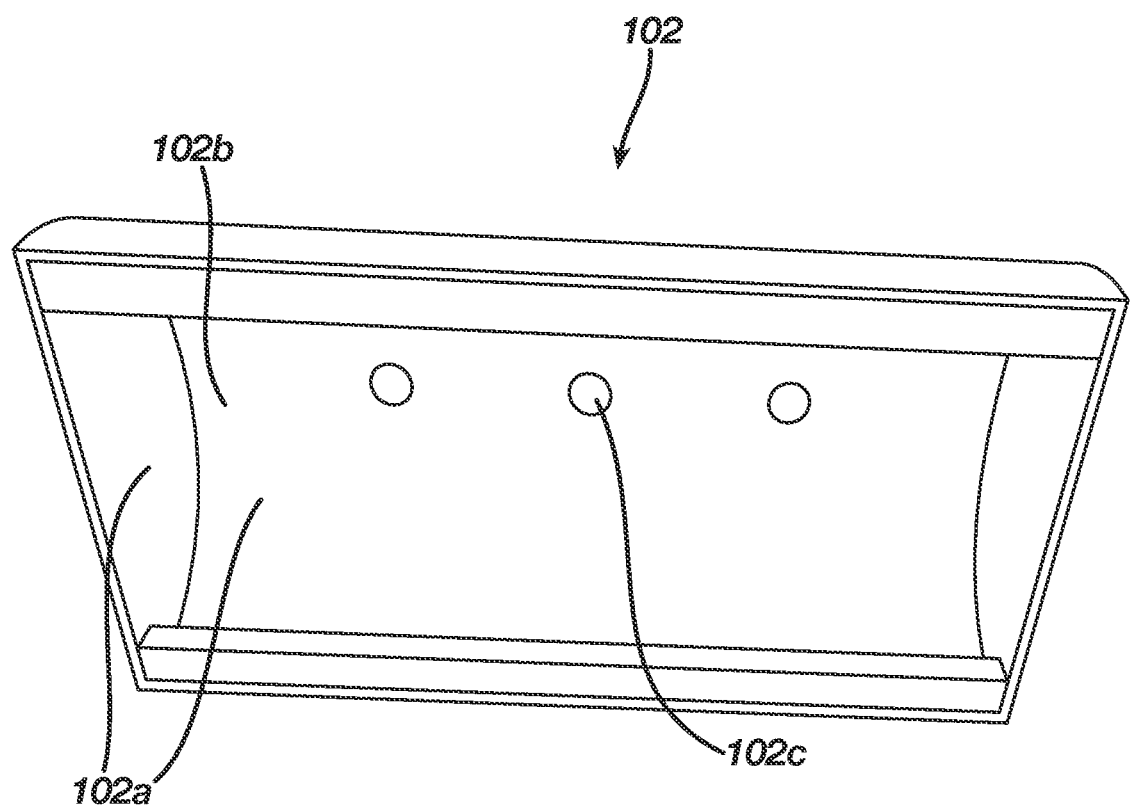
FIG. 6 illustrates an example light box in accordance with the present disclosure.

Referring to FIG. 6, the light box 102. The light box 102 may be coated inside (e.g., on an internal curved reflective surface) for reflectance of the wavelengths of light chosen for inspecting the packages. The light box 102 may have a curved side 102b on which may be located at least one window 102c. The curved side 102b may be parabolic in shape or round or some other shape. The curved side 102b of the light box 102 directs the light towards the items under inspection. In another embodiment, with a transmission based measurement, the curved portion of the light housing may be on the other side of the inspected samples from the camera 104 and the gripping stage 108 may be transparent.

The light box 102 may comprise a light source. The light source may comprise one or more light emitting devices (e.g., light emitting diodes (LEDs)). As an example, the light source may be or comprise an LED light strip of a plurality of LEDs. The light source may be configured to emit light across a spectrum of wavelengths. The light source may be configured to emit light of one or more wavelengths. The light source may be configured to emit different spectra at different times. The light box 102 may comprise one or more sensors such as a camera to capture image data of illuminated objects within the light box 102.

Returning to FIGS. 1-5, one or more sensors such as camera 104 may be mounted to the platform 106 by clamps 124, which may isolate the camera from vibrations. The system 100 may be disposed between existing stations of a manufacturing line which packages the lenses. Other configuration may be used. As an illustrative example, the lenses may be arranged in two sets of trays 110a, 110b. The line of motion 126 of the packaged lenses is shown from left to right in FIG. 1. Trays 110a, 110b of packaged lenses are brought in the line of motion 126 underneath a moveable, rotatable gripping stage 108 such as an end effector. The gripping stage 108 may be coupled to an armature. The gripping stage 108 may be coupled a pneumatic lift 112 and a pneumatic pivot 114 (shown in FIG. 2 below). The gripping stage 108 may pick up the packages from the two rows 110a, 110b. The pneumatic lift 112 may lift the stage 108 up so that the stage is co-planar with the cameras 104. The pneumatic pivot 114 may rotate the stage 108 about a hinge 118 (also shown in FIG. 2 below) so that the package bowls are faced towards the cameras 104. Other configurations may be used. A source of illumination may illuminate the packages and the resulting image may be recorded by the camera 104. The light box 102 may comprise the source of illumination and directs the illumination towards the packaged lenses.

The cameras 104, which may embody one or more sensors, may be mounted by vibration isolation clamps 124 on the platform 106. The camera 104 inlet may be mounted facing the light box 102. The light box 102 may be mounted on the platform 106 by a mounting plate 122. The pneumatic lift 112 lifts the gripping stage 108 on which the packages may be gripped. Once lifted up, the gripping stage 108 rotates about a hinge 118 in the rotational direction 132 shown so the packages face the camera 104. After taking a picture, the gripping stage 108 may be rotated to face down. The stage 108 may be then lowered by the pneumatic lift 112, and the samples are then released from the gripping stage back into the trays 110*a*, 110*b*. The trays 110*a*, 110*b* are then moved to the next station in the production line and new trays, with uninspected packages may be moved underneath the gripping stage 108.

As an illustrative example, the pneumatic lift 112 may have a first stabilizing bracket 116 affixed on top to provide greater stability. The platform 106 may be attached to a second stabilizing bracket 120. The stabilizing brackets 116, 120 may be attached to a larger, heavier mass to inhibit motion of the system. This mass is not shown in the figure. In an embodiment, multiple cameras 104 may be aligned with windows in the light housing.

Figure 5:
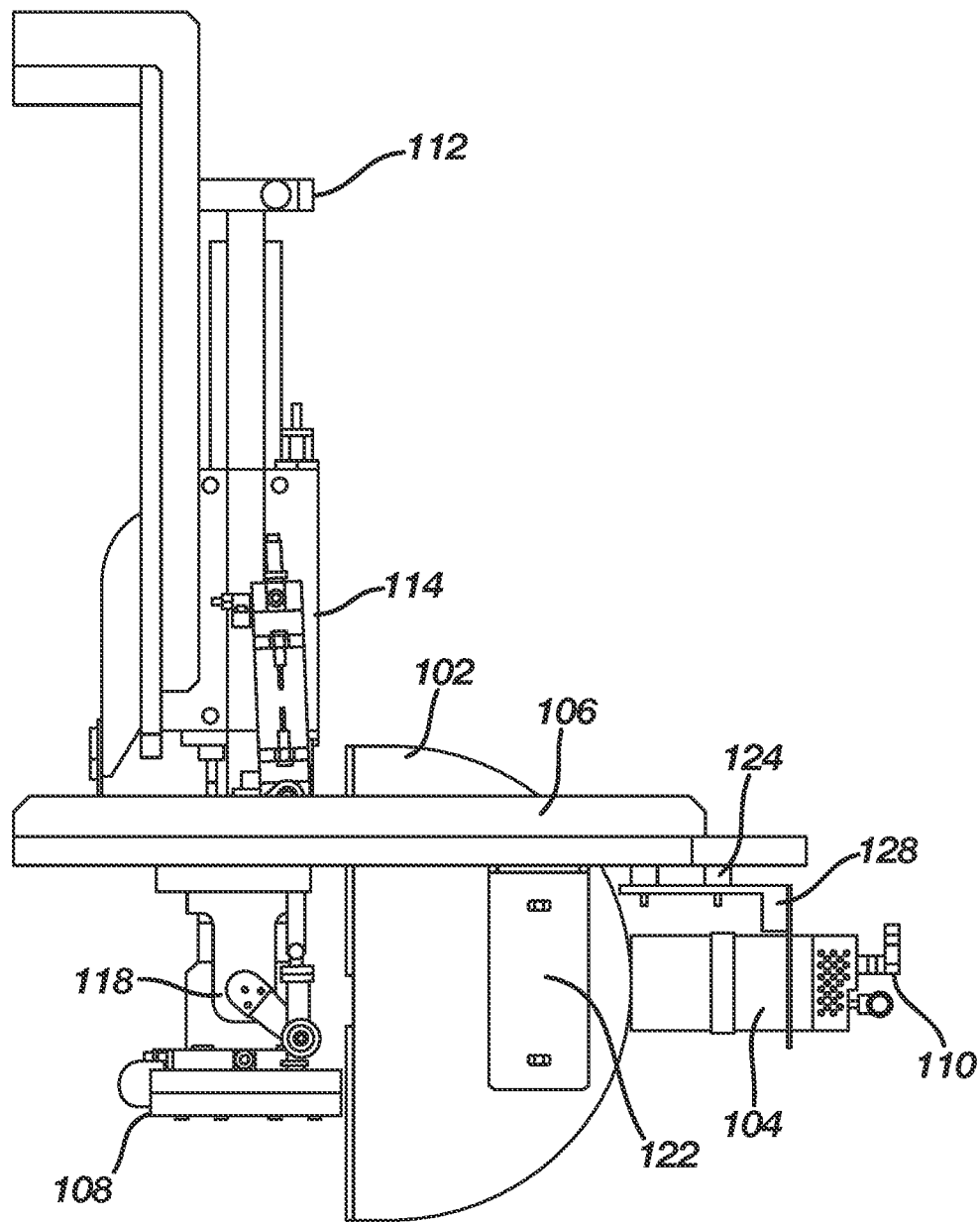
FIG. 5 illustrates a side view of a system in accordance with the present disclosure.

FIG. 5 shows a cross-sectional drawing of the system. Details of the pneumatic lift 112 are shown, including the hinge 118, and the pneumatic pivot 114. The light housing 102 may be mounted on the platform 106. The camera 104 may be mounted on the platform 106 by means of clamps 124 which isolate from vibrations. The camera 104 may be coupled to a bracket 128 for mounting using the isolation clamps 124. The bracket 128 may aid in the dampening of vibrations reaching the camera 104.

One or more sensors (e.g., the camera 104) may be configured to capture image data (e.g., one or more images) of the package or packages while under illumination. An algorithm (e.g. a machine learning algorithm and/or rule-based algorithm) may determine, based on the image, whether there is any debris, a missing lens, a mis-packaged lens, or multiple lenses in the container. If any of the packages are so identified, that package may be identified for later segregation and inspection. For some down-stream production configurations an entire array of packages may be set aside rather than an individual container. The particular puck identified as containing debris, multiple lenses, or missing a lens may be identified, and just that one in particular may be removed for future inspection.

In the example depicted in FIGS. 2-6, three cameras were used. An example camera could be Illunis RMOD 71 camera with approximately 71 Megapixels per camera (10,000 by 7094 pixels). Example lamps may emit light in the blue (465 nm) or the ultra-violet (UV) (365 nm). For instance, LED strobe lights such as the DL-067 model from Advanced Illumination may provide two wavelengths for illumination together or at different times. Other sources of illumination may be employed and other wavelengths. Likewise, the mode of illumination may be reflection (as depicted in the figures) or transmission (not depicted).

Separate images of the packages may be taken by the one or more sensors (e.g., camera 104) when under illumination by the light source. Those skilled in the art will recognize that many other possible detectors and sources of illumination may also be employed. A special housing such as a light box may be employed to exclude stray light and to allow only the desired and controlled illumination during exposure to the camera(s). The detectors/cameras may also be isolated from vibration of other equipment to aid in the identification of defectively packaged lenses. Once the image or images have been acquired, pre-processing of the images may take place prior to applying a machine learning (ML) algorithm and/or rule-based algorithm to these images to identify those with multiple lenses, missing lenses, or debris/foreign matter inside the packages. Pre-processing of the images may comprise identifying the specific region of interest, enhancing contrast, adding or subtracting other images taken, and the like. Further details of this ML algorithm are provided below. Before the algorithm may be used, it required training by inserting large numbers of images with and without specific types of debris, multiple lenses, improperly inserted lenses, or missing lenses. The debris inserted into packages for training the algorithm was chosen based on the largest number of complaints of foreign matter in packages, as given in Table 1.

Figure 7:
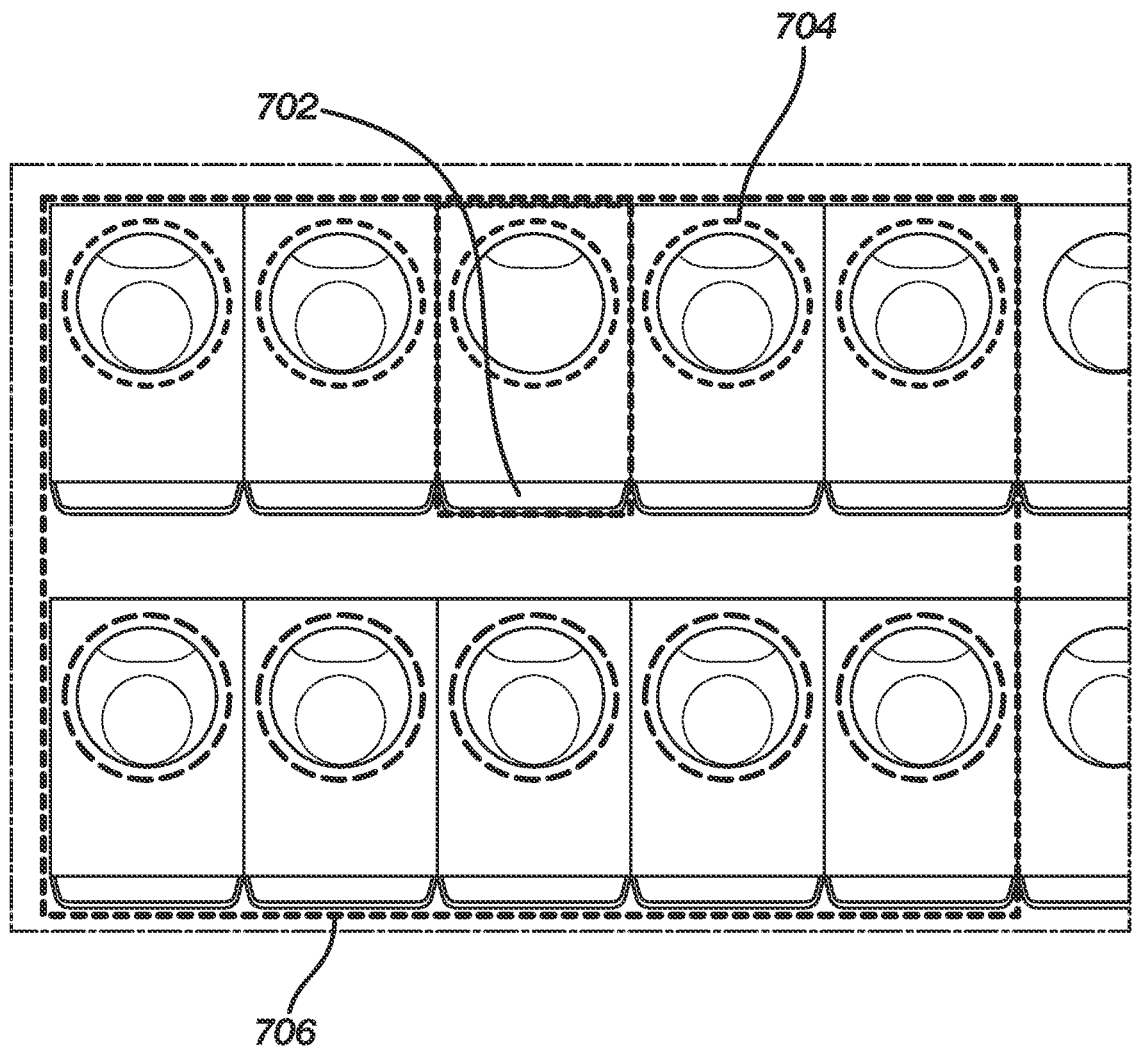
FIG. 7 illustrates an image of an example package of contact lenses.

FIG. 7 shows an image of 10 sealed packages and two packages only partially in the image. The area surrounded by the dash-dot-dash white line 706 denotes the sub-set of packages of interest. The image region of interest analyzed by a machine learning algorithm and/or rule-based algorithm is depicted by the circles 704 in the image. One package 702 (surrounded by the dashed white line) has been highlighted as missing a lens by the algorithm.

As an example, the system may capture multiple images for each array of packages, for instance one image per illumination wavelength and per camera. Each of the cameras may capture images while the packages may be illuminated by different light sources. For instance, a visible (blue light) image and an ultraviolet image may be captured in succession. The images may be processed through a machine learning algorithm (or and/or rule-based algorithm) developed with MatLab Machine Learning tools. The algorithm may segment the image into the regions of interest (ROIs) (the package bowls) and discards the remainder of the image. In an example, ultraviolet images may be processed to identify packages with missing lenses or with multiple lenses and visible images may be processed to detect foreign matter. Other configurations of wavelengths and image analysis may be used. The results of the processed images may be sent to the machine PLC (programmable logic controller) on the production line where commands may be sent to remove defective product. In one example, a production line may be configured to remove an entire row of packages, or 15 at a time, if any of the 15 are defective.

A machine learning algorithm and/or rule-based algorithm for foreign matter may be taught and or trained by collecting thousands of images of the various types of defects (e.g. foreign matter of plastic, aluminum, steel, or other materials) of various sizes. Likewise, the machine learning algorithm may be also trained for missing and multiple lenses by collecting thousands of images of those defects. Good lens images (no defects) may also be collected. The algorithm may be taught by supervised learning, meaning that the software may be told which packages are defective, in which way they are defective, and which packages are not defective. Through this training the algorithm may identify the proper weighting of coefficients of the neural network. Other algorithms and training or testing techniques may be used.

A system for detecting missing, multiple, or debris lens packages may be installed in a manufacturing line so that inspection occurs after the product has been sealed in the primary package but prior to sterilization. This enables detection for particulate that may be generated after the Automated Lens Inspection (ALI) system which may be located upstream of the heat seal process. Missing and multiple lenses that occur as a result of process anomalies downstream of ALI may also be detected. In an example, a system for MMD detection may be designed to be installed onto a flexible manufacturing platform within approximately half the standard 1-meter module space. Additional support equipment may be located behind the module.

Figure 2:
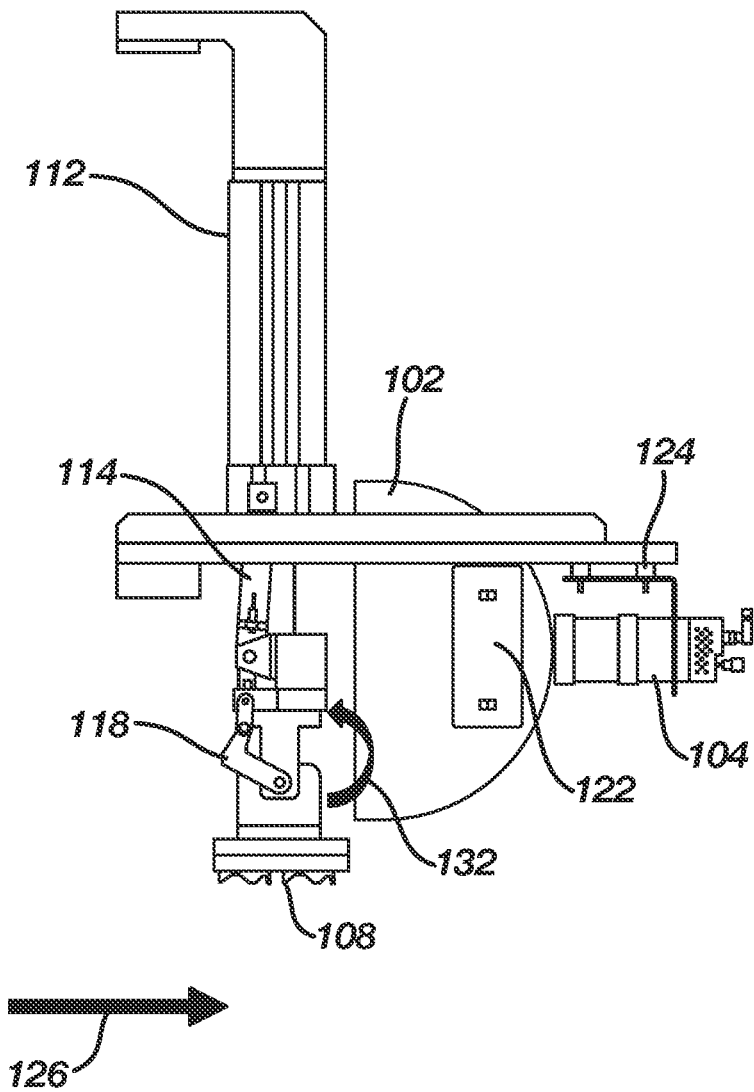
FIG. 2 illustrates a diagrammatic side view of a system in accordance with the present disclosure.
Figure 3:
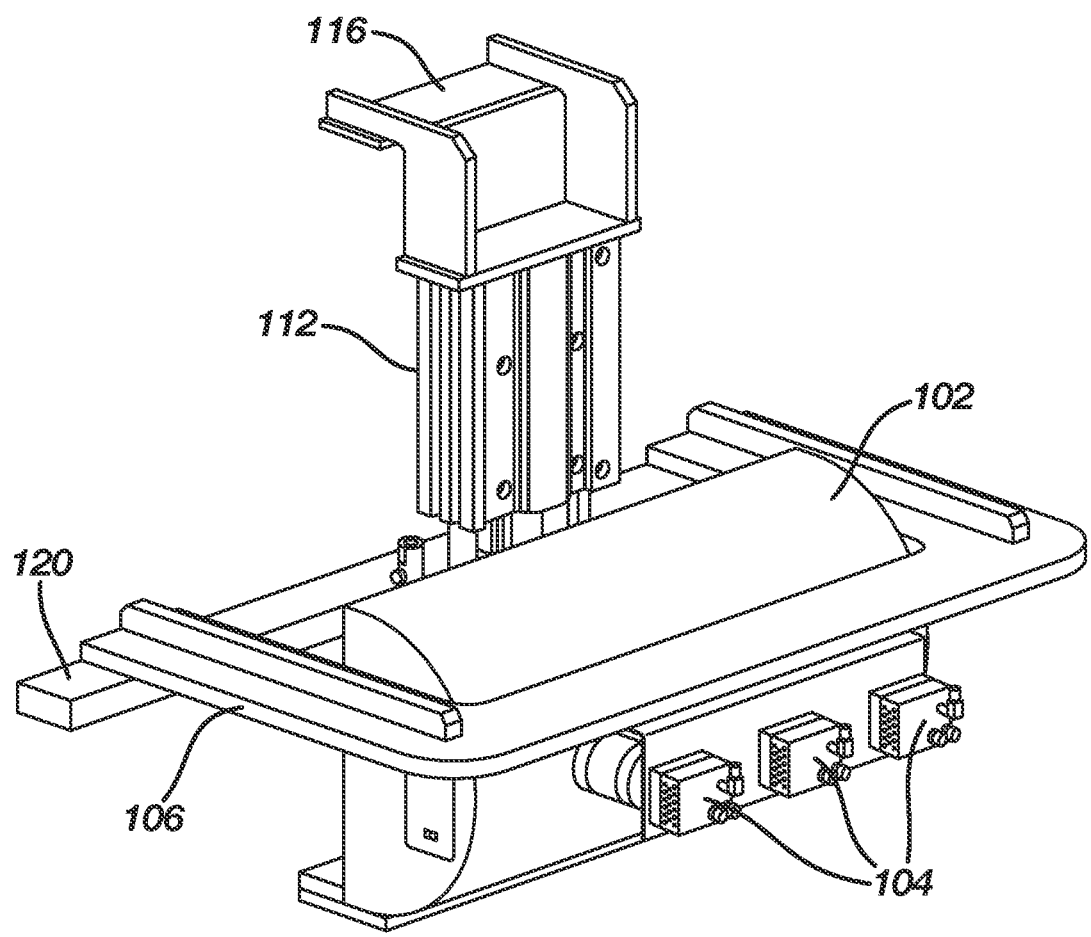
FIG. 3 illustrates a perspective view of a system in accordance with the present disclosure.
Figure 4:
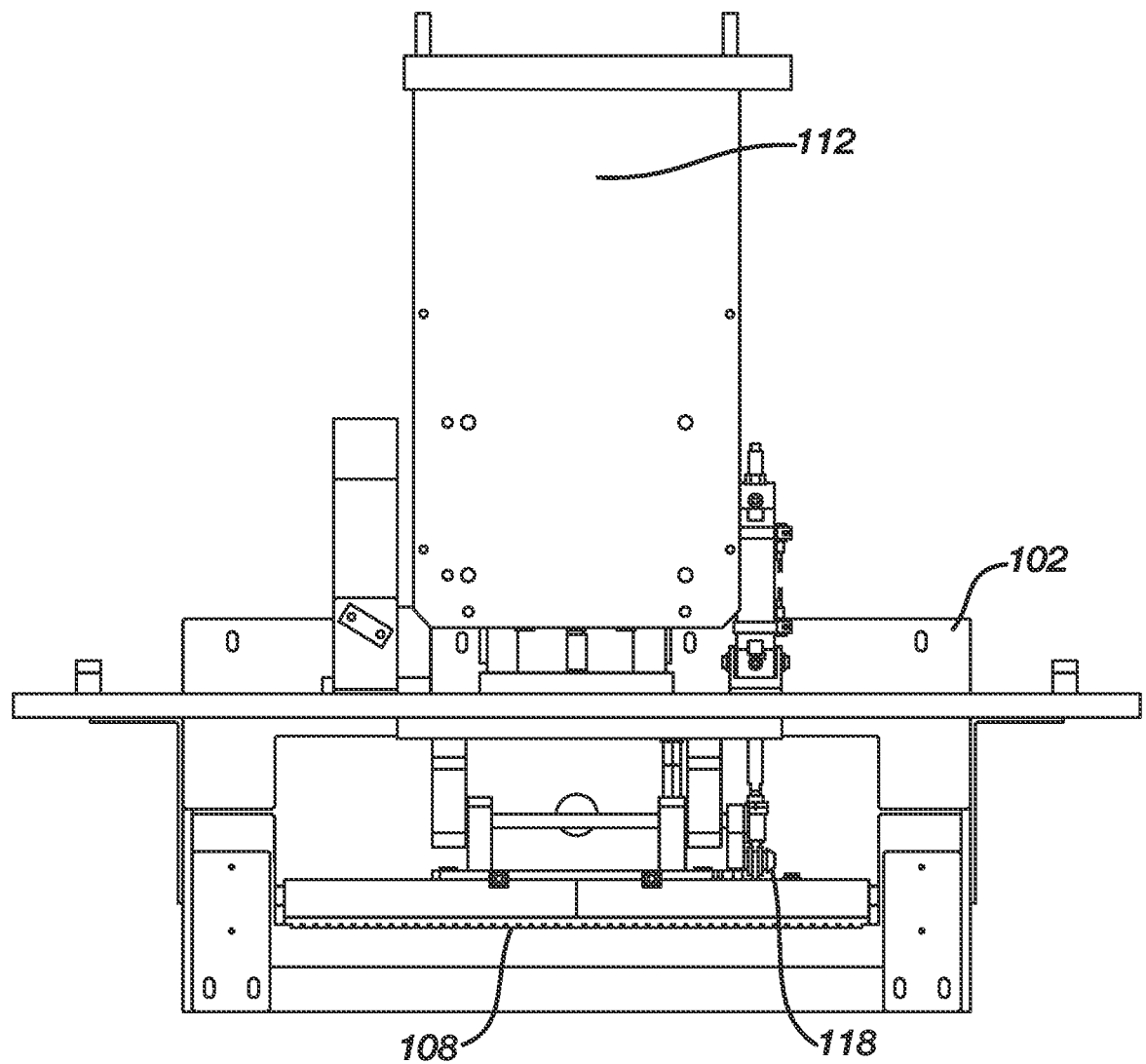
FIG. 4 illustrates an elevation view of a system in accordance with the present disclosure.

An exemplary system may comprise three cameras that inspect 2 rows of 15 packages (see FIG. 2). The field of view for each camera may cover 2 rows of 5 packages (10 packages total). For every inspection, two images may be captured per camera including an ultraviolet image for missing and multiple lens detection and a visible light image for debris detection. In an example, the light may be provided by a dual wavelength DL-067 LED strobe as part of the light box.

Image Processing

As a non-limiting example, image processing may be performed on each image using MATLAB machine learning algorithms. Each image of 10 packages may be segmented so that only the areas within the package bowls may be analyzed. Pass/Fail results for each cavity may be calculated and sent to the PLC for statistics gathering purposes as well as for future processing. However, due to packages being attached as arrays and the machine architecture, packages with any of the flaws above may be rejected downstream of the system along with all others in their respective row. A row of packages with no flaws detected may continue through the manufacturing process.

TABLE 2

Matlab algorithm parameters

| Parameter Name | Value | Notes |
| --- | --- | --- |
| MM_Enable | True | Checks for multiple or missing lenses |
| D_Enable | True | Checks for debris |
| Intensity enable | True | Limits intensity of lamp(s) |
| Intensity_Min_UV | 25 | Maximum UV intensity |
| Intensity_Max_UV | 85 | Minimum UV intensity |
| Intensity_Min_Vis | 100 | Maximum visible light intensity |
| Intensity_Max_Vis | 235 | Minimum visible light intensity |
| Missing_Threshold | 0.9 | Threshold for identifying "missing lens" |
| Multiple_Type1_Threshold | 0.98 | Threshold for type 1 "multiple lens" |
| Multiple_Type2_Threshold | 0.85 | Threshold for type 2 "missing lens" |
| Opaque_Debris_Threshold | 0.95 | Threshold for "opaque debris" |
| Translucent_Debris_Threshold | 0.953 | Threshold for "translucent debris" |
| Hist_Thresh_Vis | 50.0 | Historical threshold for visible light |
| Hist_Thresh_UV | 15.0 | Historical threshold for UV light |

An algorithm was developed in Matlab to determine whether a given image was likely to contain debris or so some other malfunction (e.g. mis-aligned, multiple lenses, or a missing lens). Some of the parameters are shown in Table 2 above.

A convolutional neural network (CNN) may be designed or modified and implemented for identification of packages to be rejected. A module, such as a Matlab module be modified to slice original images of in size down to the regions of interest (ROIs) appropriately sized to feed into the CNN. These images were then defined by a region of interest (ROI) of X by Y pixels (monochrome) defined by the packages themselves so that each ROI fed into the CNN had the appropriate number of pixels for processing. The ROI was defined by first identifying the dowel point on the plate holding the pucks and then defining each ROI from that center point. In the later stages of the network a ReLU (rectifying linear unit) was used as well as dropping half the nodes in a randomized manner. The CNN was trained using known rejects identified by a subject matter expert (SME) or later by rejects from quality control. Details of some training runs are given in the experimental sections below. A data set of images of sealed lens packages may be created and may be divided into sub-sets. The images may comprise packages without any defects, no foreign matter, single lenses and also may comprise defectively packaged lenses or packages with multiple or missing lenses or packages with foreign matter. These data sets may allow training of the CNN. Once the CNN has been trained, the CNN may be tested by feeding in a validation data set. Various model parameters (Table 2) were varied during training to obtain the lowest false reject rate contingent upon maintaining the highest true reject rate possible.

Figure 8:
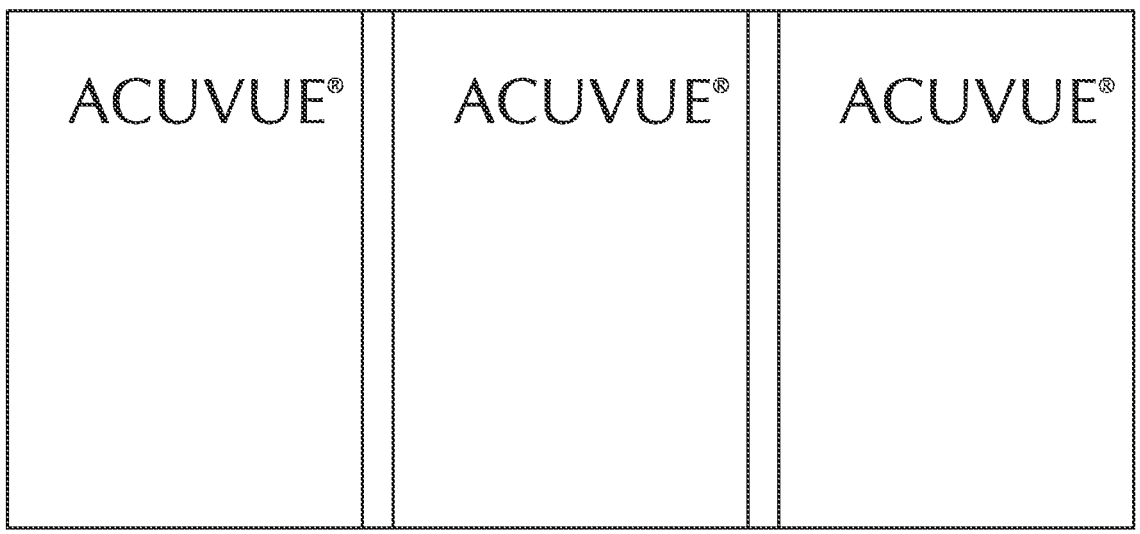
FIG. 8 illustrates an example package of contact lenses.
Figure 9:
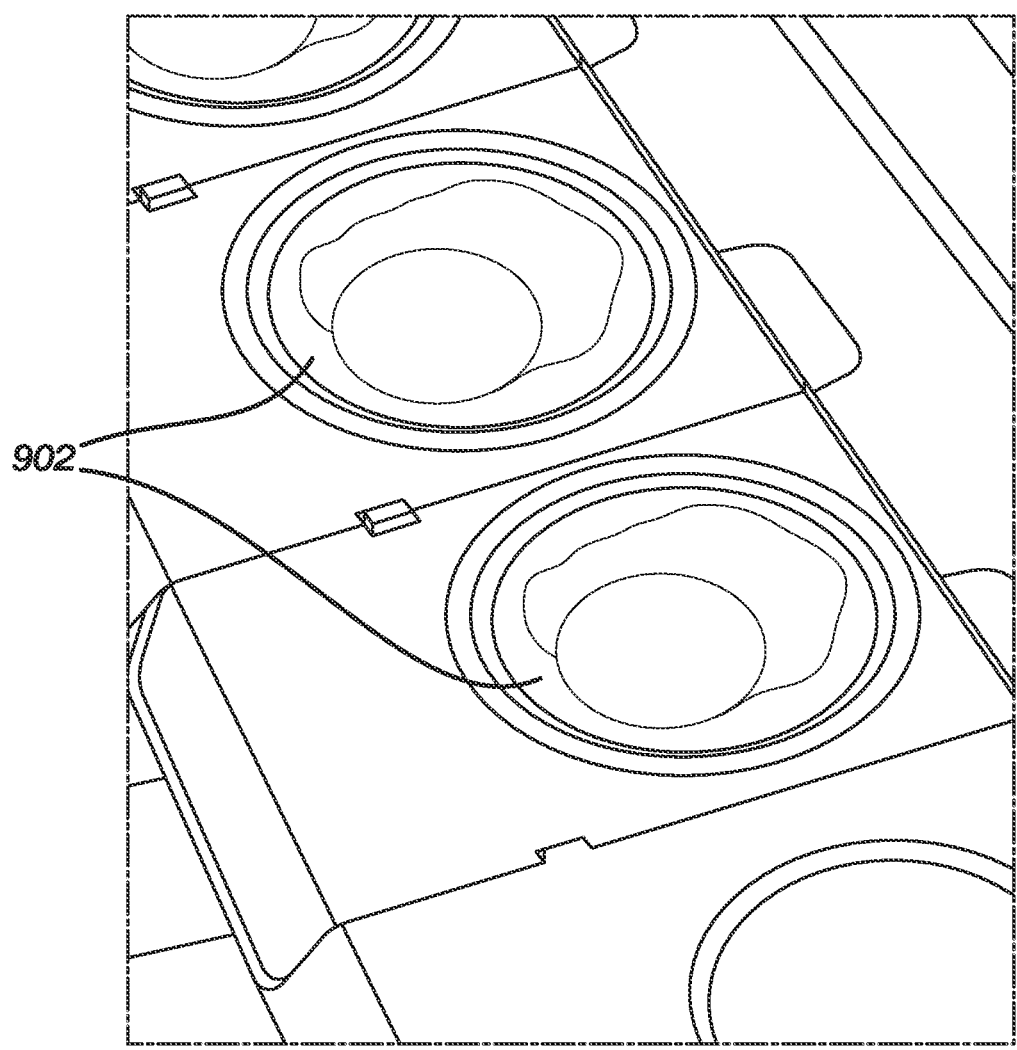
FIG. 9 illustrates an example package of contact lenses.
Figure 10:
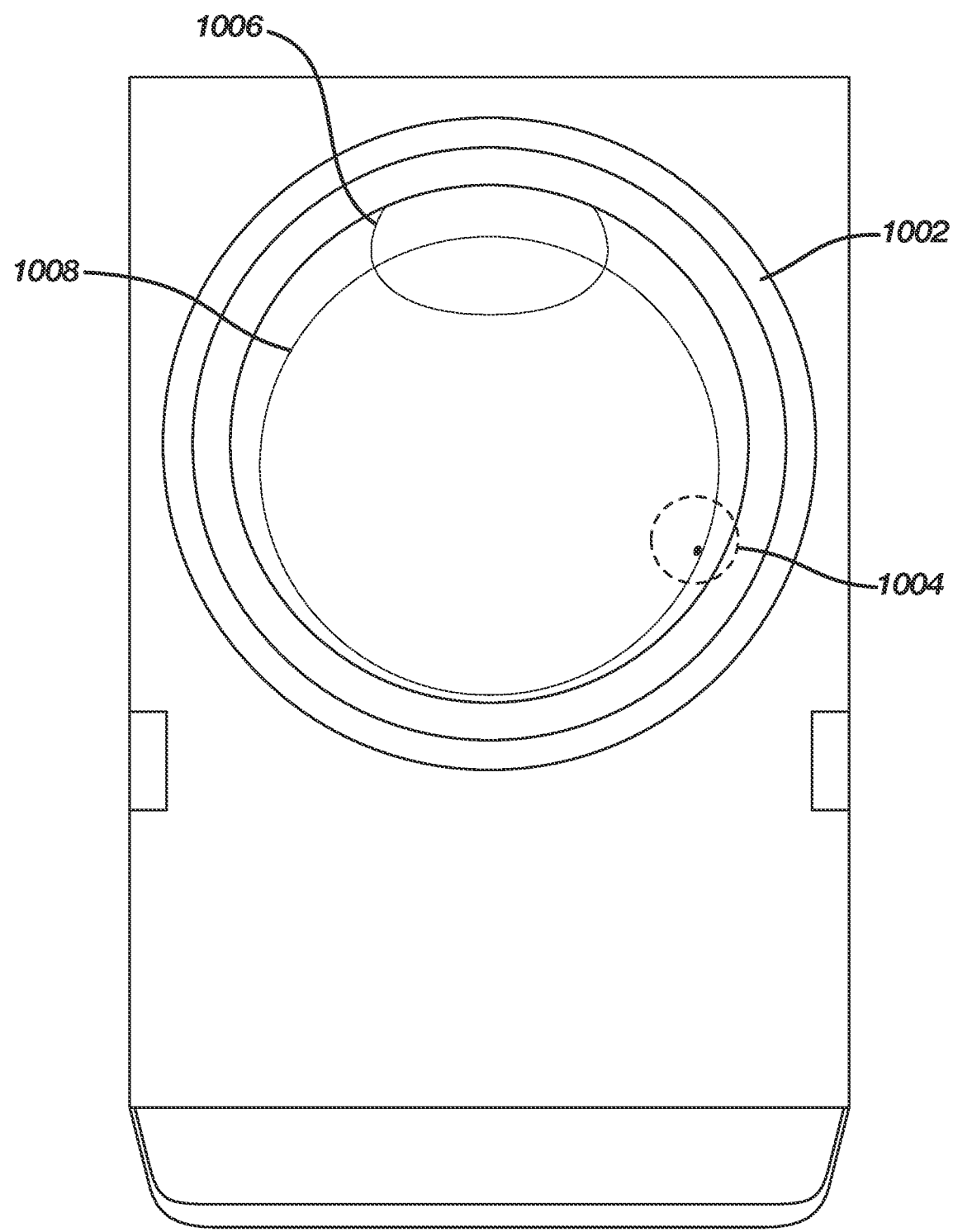
FIG. 10 illustrates an example package of contact lenses showing a gas bubble and example foreign matter.
Figure 11:
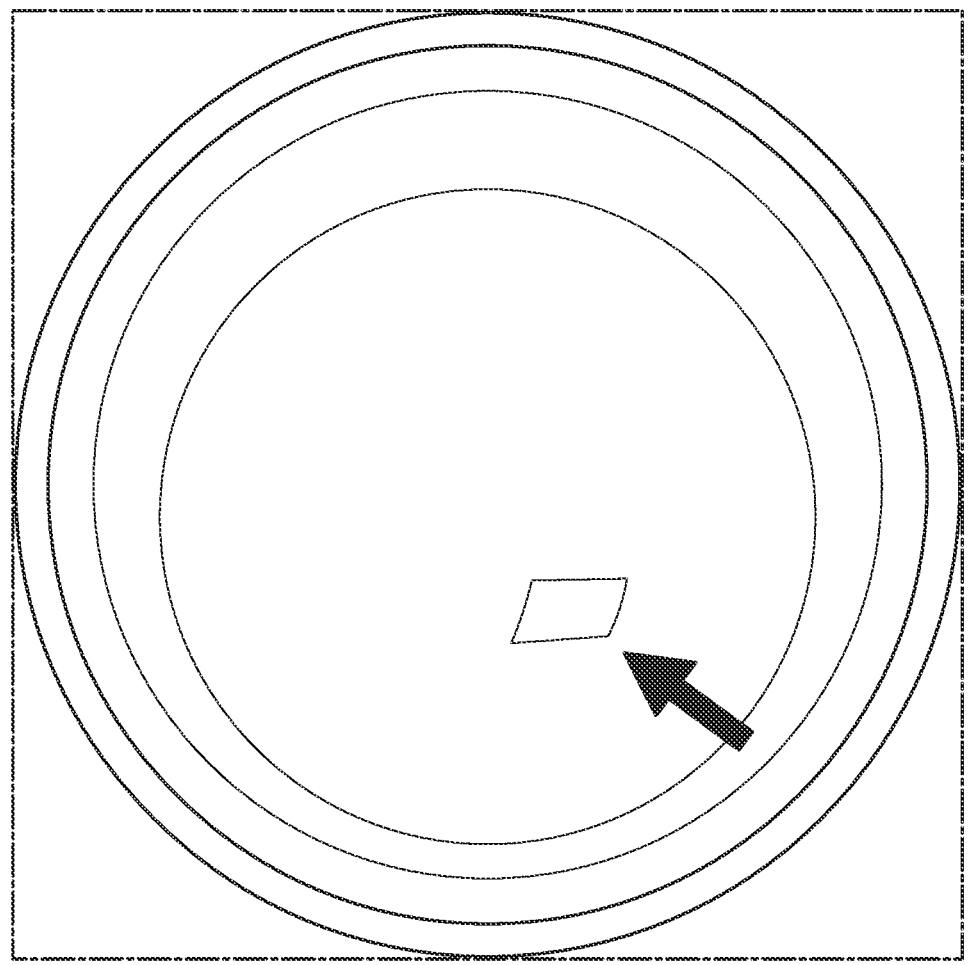
FIG. 11 illustrates an image of an example package of contact lenses showing example foreign matter
Figure 12:
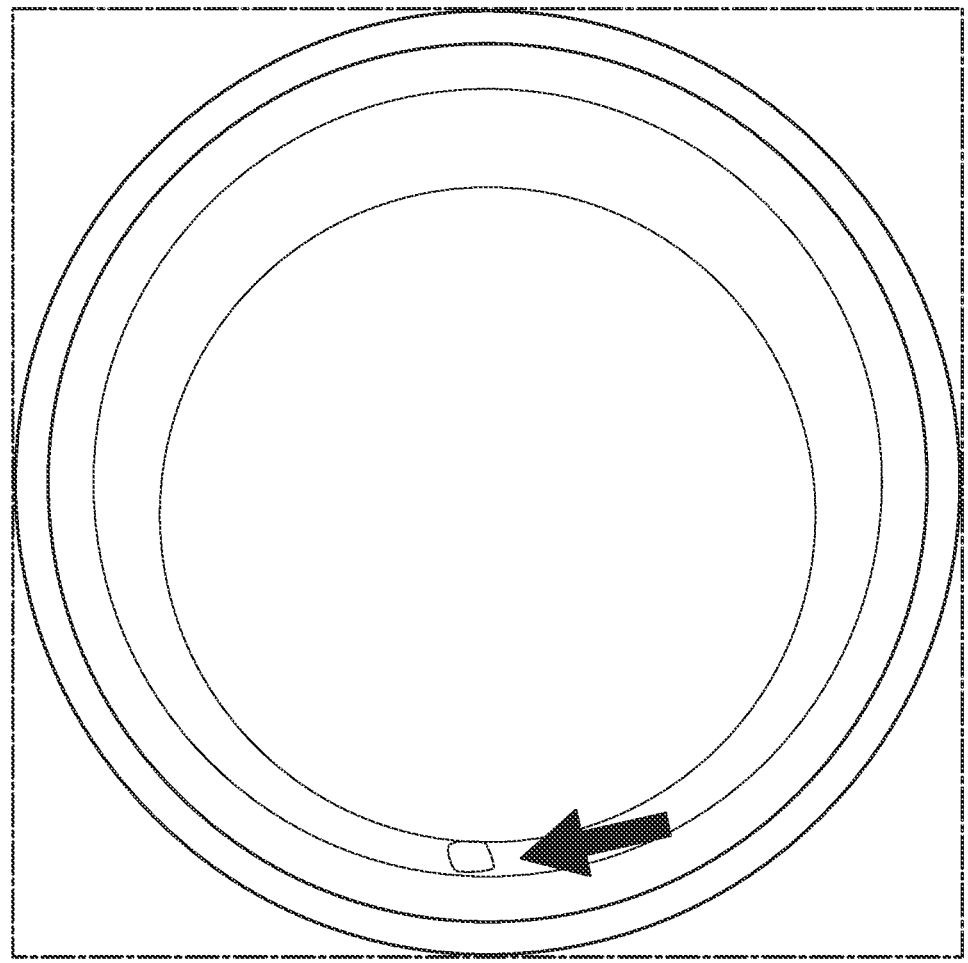
FIG. 12 illustrates an image of an example package of contact lenses showing example foreign matter.
Figure 13:
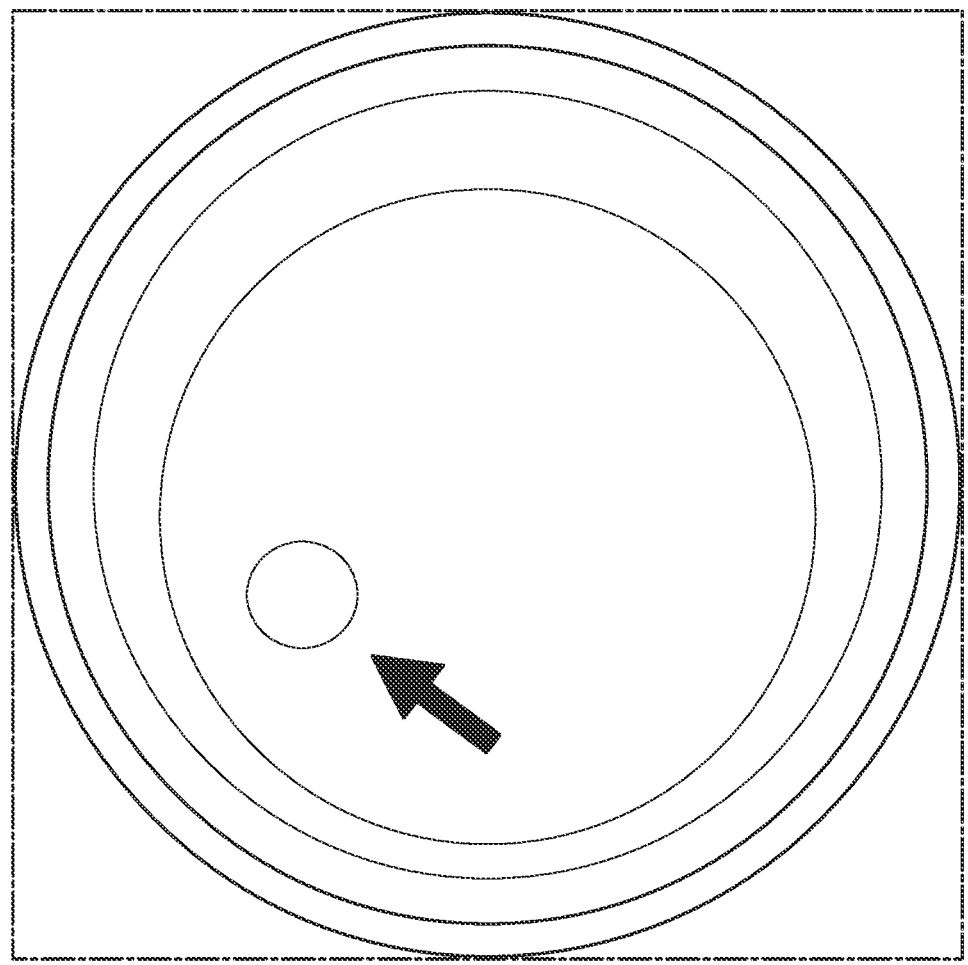
FIG. 13. Illustrates an image of an example package of contact lenses showing example foreign matter.
Figure 14:
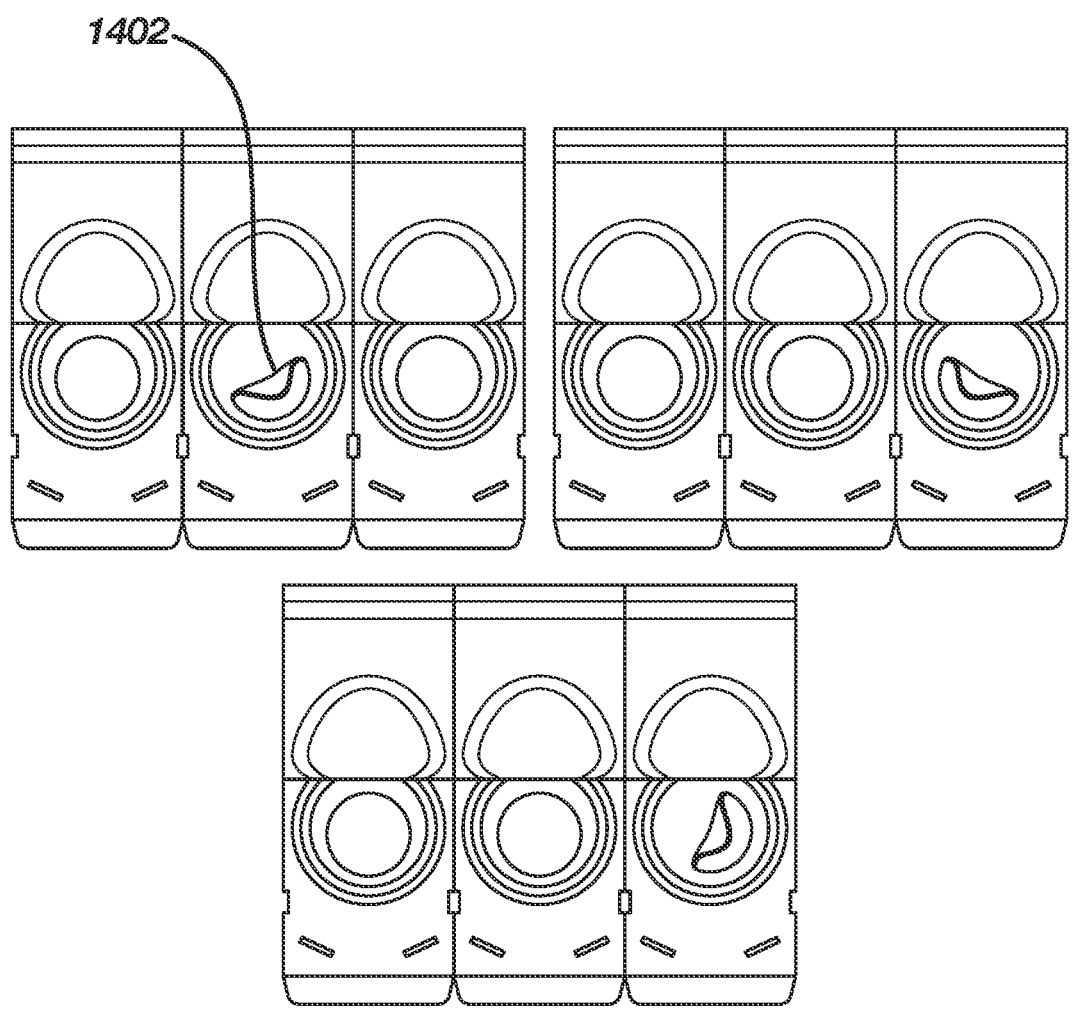
FIG. 14 illustrates an image of an example package of contact lenses.

FIGS. 8-14 depict the packages and various debris or defectively packaged lenses (e.g., multiple or missing lenses). FIG. 8 shows the top view of a set of three packages. FIG. 9 shows the bowl (bottom) view of another set of three lenses. The bowl 902 containing the contact lens is shown, and filled with fluid. FIG. 10 shows a bowl/bottom view of the lens, fluid, and debris in the packaging. The circular region 1002 may be identified by the system automatically as the ROI (e.g. circles in FIG. 7) and the other region of the image may be ignored. A small piece of debris 1004 is identified by the arrow and the dashed circle. A bubble 1006 is at the top of the fluid filled, sealed package. The outline of the lens 1008 is seen around the edge of the circular bowl 1002. FIG. 11 shows a piece of aluminum foil approximately 3.6 mm long. FIG. 12 shows a steel sphere approximately 1.0 mm in diameter. FIG. 13 shows a polystyrene sphere approximately 1.9 mm in diameter. FIG. 14 shows some bowls with defectively sealed lenses, for instance a lens 1402 without saline solution.

Figure 15:
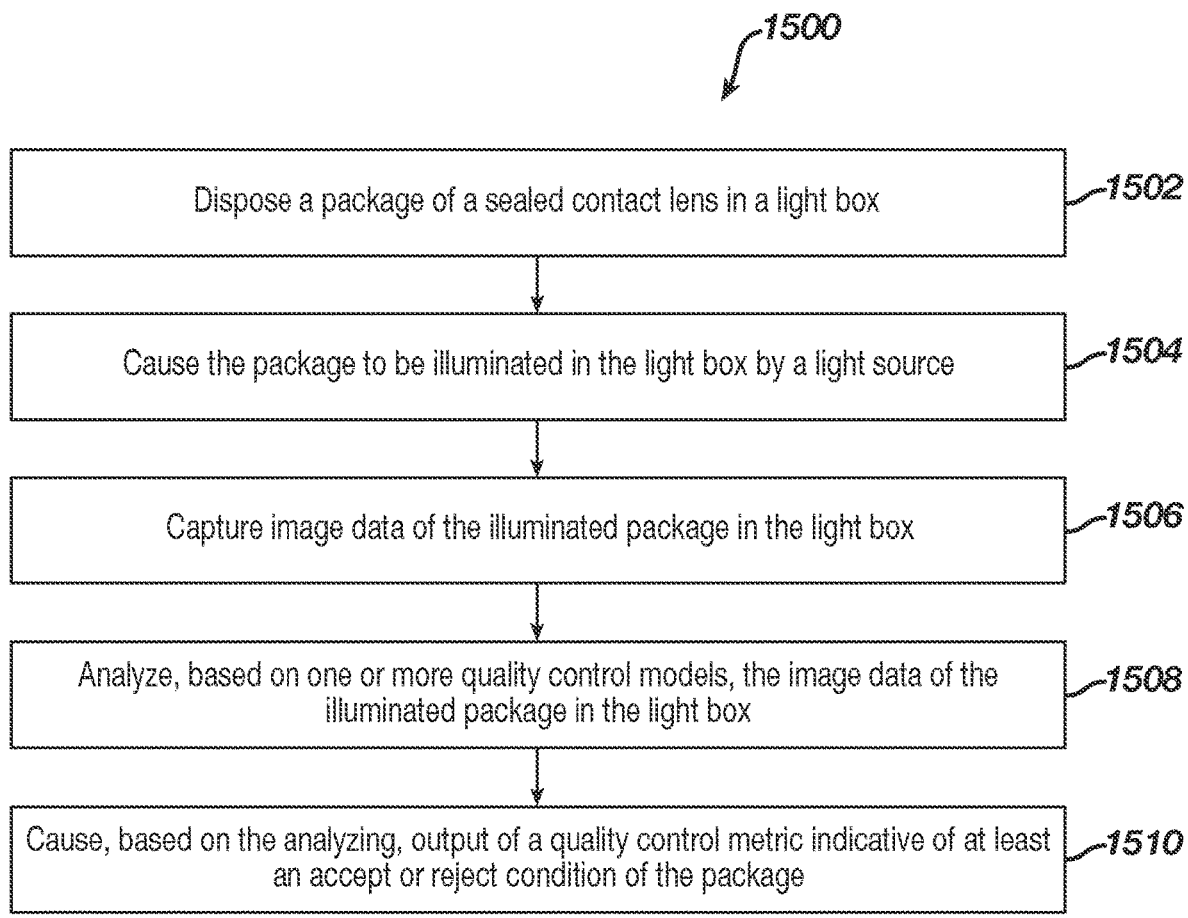
FIG. 15 illustrates an example method in accordance with the present disclosure.

FIG. 15 illustrates an example method 1500 in accordance with the present disclosure. The method may comprise disposing a package of a sealed contact lens in a light box, at 1502. At 1504, the package may be caused to be illuminated in the light box by a light source. As described herein the light source may be or comprise direct or indirect reflected light from one or more light emitting devices (e.g., LEDs). Various light spectrums may be used. At 1506, image data of the illuminated package in the light box may be captured. Such image data may be captured by one or more sensors such as cameras. At 1508, the image data may be analyzed based on one or more quality control models. The quality control models may be or comprise one or more machine learning algorithms trained and or tested on image data of various sealed packages. At 1510, a quality control metric may be outputted based on the analysis. As an example, the quality control metric may be indicative of at least an accept or reject condition of the package.

Figure 16:
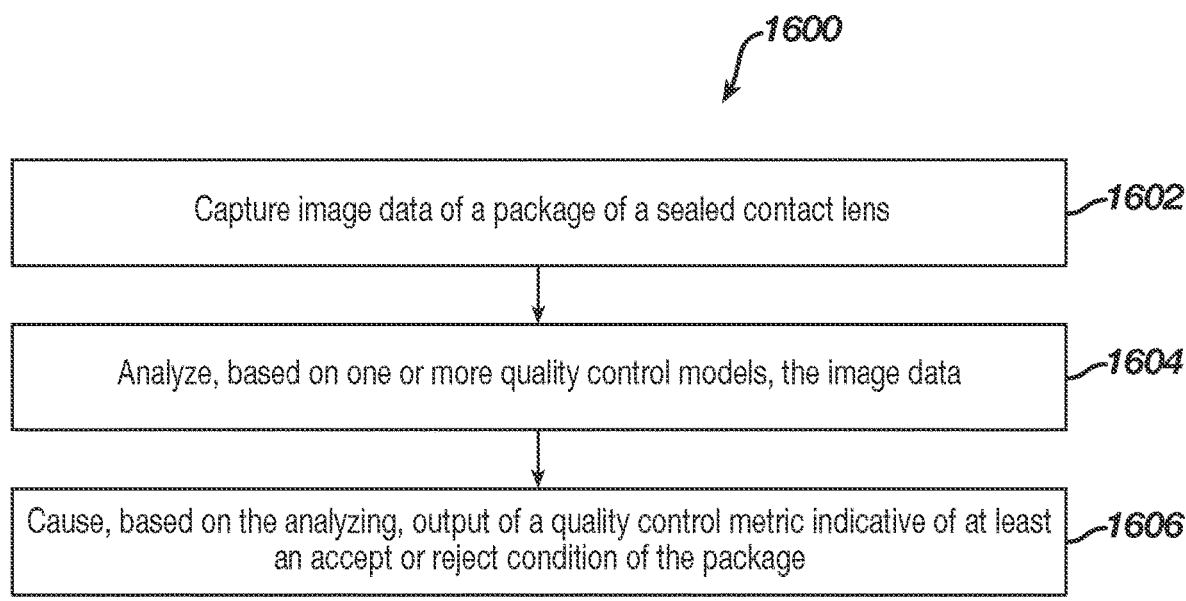
FIG. 16 illustrates an example method in accordance with the present disclosure.

FIG. 16 illustrates an example method 1500 in accordance with the present disclosure. At 1602, image data of a package of sealed contact lenses may be captured. Such image data may be captured by one or more sensors such as cameras. At 1604, the image data may be analyzed based on one or more quality control models. The quality control models may be or comprise one or more machine learning algorithms trained and or tested on image data of various sealed packages. At 1606, a quality control metric may be outputted based on the analysis. As an example, the quality control metric may be indicative of at least an accept or reject condition of the package.

EXAMPLE EXPERIMENT SECTION

Sample Preparation

Commercially available debris samples were manually placed into packages with finished lenses prior to heat sealing. The samples ranged in size from 0.25 mm to 7.8 mm included stainless steel, polystyrene and polypropylene.

Non-commercial samples were made from small pieces of aluminum lid stock material, cut cardboard, human hair samples and steel washers. For missing and multiple lenses, on-line packages were used to manually populate double lens and missing lens packages.

All studies were completed using multifocal lenses including −8.00/8.35, −6.25/1.25, −8.50/1.25 and −2.75/1.75 stock keeping units (SKUs).

Image Collection

After sample preparation, foreign matter packages were heat sealed and images were captured using the on-line MMD with blue light at 465 nm. Missing and multiple samples were heat sealed and images were captured using UV light at 365 mm.

Model Generation

For foreign matter detection and for missing and multiple detection, models were prepared using MATLAB version 9.7.0.1216025 (R2019b) Update 1 and supervised learning. Supervised learning is a technique where defects and non-defects are learned within the application using a training set of images to produce a model. Performance of the model is measured by a separate set of images called a validation set.

Foreign Matter Detection

The total image library consisted of 7,475 images including 704 packages with seeded foreign matter and 6,771 good packages. This library was split by a 4:1 ratio between training and validation sets, respectively.

The training set consisted of 563 prepared foreign matter samples and 5,417 good packages. A separate validation set consisting of 141 prepared foreign matter samples and 1354 good packages was also prepared.

The total image library consisted of 7,523 images including 2,747 missing, 667 multiple lens samples and 4,109 good packages. This library was split by a 4:1 ratio between training and validation sets, respectively.

The training set consisted of 6,019 images including 2,198 missing, 534 multiple and 3,287 good packages. The validation set consisted of 1504 images including 549 missing, 133 multiple lens samples and 822 good packages.

Tests results exhibited desirable results for identifying foreign material such as aluminum foil, stainless steel sphere, stainless steel sphere, stainless steel sphere, steel washer (M3), wire insulation, wire insulation (black), cardboard, human hair, polystyrene sphere—clear, polystyrene sphere—white, polystyrene fragments, polypropylene sphere—red. Other materials may be identified.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

What is claimed is:

1. A system for quality control of sealed contact lens packages, the system comprising:
    a gripper to engage a package of a sealed contact lens and releasably secure the package to the gripper;
    a control mechanism comprising an armature coupled to the gripper and configured to control a movement of the gripper;
    a light box comprising a housing having an internal curved reflective surface defining at least a portion of a light cavity, the housing defining an aperture disposed opposite the internal curved reflective surface and allowing access to the light cavity, wherein the internal curved reflective surface comprises a coating configured to reflect light in both the visible and ultraviolet spectrums;
    a light source disposed to emit visible and ultraviolet light into the light cavity; and one or more sensors disposed to capture spectral data of the light cavity;
    wherein the control mechanism is further configured to cause the gripper to dispose the package in the light cavity, and
    wherein the one or more sensors are configured to capture one or more images of the package in the light cavity illuminated by the light source;
    wherein the one or more images of the package in the light cavity comprises a first image under visible light illumination and a second image under ultraviolet light illumination; and
    wherein the system is configured to analyze, based on one or more quality control models, the image data of the illuminated package in the light box; and
    cause, based on the analyzing, output of a quality control metric indicative of at least an accept or reject condition of the package.

2. The system of claim 1, wherein the package of a sealed contact lens comprises a lens cavity for holding a contact lens and a sealed enclosure disposed over the lens cavity.

3. The system of claim 2, wherein the package of a sealed contact lens further comprises a lens fluid disposed in the lens cavity and restrained by the sealed enclosure.

4. The system of claim 2, wherein the sealed enclosure comprises a heat sealed foil.

5. The system of claim 1, wherein the gripper comprises a suction device configured to releasably secure the package to the gripper.

6. The system of claim 1, wherein the control mechanism comprises a lift mechanism and is configured to control a movement of the gripper along at least a first axis.

7. The system of claim 1, wherein the control mechanism configured to control an articulation of the armature and movement of the gripper rotationally about at least a second axis.

8. The system of claim 1, wherein the light source comprises one or more light emitting diodes.

9. The system of claim 1, wherein the light source comprises a linear strip of two or more light emitting diodes.

10. The system of claim 1, wherein the light source is disposed to emit light toward the internal curved reflective surface.

11. The system of claim 1, wherein the light source and the one or more sensors are disposed such that the light is not emitted directly into the one or more sensors.

12. The system of claim 1, wherein the one or more sensors comprises a camera.

13. The system of claim 1, wherein the spectral data comprises images.

14. The system of claim 1, further comprising a vibration control device coupled to the light box to at least partially vibrational isolate the light box from the control mechanism.

15. The system of claim 1, further comprising a vibration control device coupled to the light box to at least partially vibrational isolate the light box from the package on the gripper.

16. The system of claim 1, wherein the one or more quality control models comprises a machine learning algorithm or rule-based algorithm trained on image data of sealed contact lens packages.

17. The system of claim 1, wherein the one or more quality control models comprises a foreign material detection model.

18. The system of claim 1, wherein the one or more quality control models comprises a missing lens detection model.

19. The system of claim 1, wherein the one or more quality control models comprises a multiple lens detection model.

20. A method for quality control of sealed contact lens packages, the method comprising:
disposing a package of a sealed contact lens in a light box;
causing the package to be illuminated in the light box by a light source;
capturing image data of the illuminated package in the light box, wherein the image data of the illuminated package in the light box comprises a first image under visible light illumination and a second image under ultraviolet light illumination;
analyzing, based on one or more quality control models, the image data of the illuminated package in the light box; and
causing, based on the analyzing, output of a quality control metric indicative of at least an accept or reject condition of the package.

21. The method of claim 20, wherein the light box comprises a housing having an internal curved reflective surface defining at least a portion of a light cavity, the housing defining an aperture disposed opposite the internal curved reflective surface and allowing access to the light cavity.

22. The method of claim 21, wherein the internal curved reflective surface comprises a coating configured to reflect light in both the visible and ultraviolet spectrums.

23. The method of claim 20, wherein the light source comprises one or more light emitting diodes.

24. The method of claim 20, wherein the light source comprises a linear strip of two or more light emitting diodes.

25. The method of claim 21, wherein the light source is disposed to emit light toward the internal curved reflective surface.

26. The method of claim 20, wherein the light source and the one or more sensors are disposed such that the light is not emitted directly into the one or more sensors.

27. The method of claim 20, wherein the package of a sealed contact lens comprises a lens cavity for holding a contact lens and a sealed enclosure disposed over the lens cavity.

28. The method of claim 27, wherein the package of a sealed contact lens further comprises a lens fluid disposed in the lens cavity and restrained by the sealed enclosure.

29. The method of claim 27, wherein the sealed enclosure comprises a heat sealed foil.

30. The method of claim 20, wherein the one or more quality control models comprises a machine learning algorithm trained on image data of sealed contact lens packages.

31. The method of claim 20, wherein the one or more quality control models comprises a foreign material detection model.

32. The method of claim 20, wherein the one or more quality control models comprises a missing lens detection model.

33. The method of claim 20, wherein the one or more quality control models comprises a multiple lens detection model.

* * * * *